W. LEE.
MUD GUARD FOR WHEELS.
APPLICATION FILED JAN. 17, 1913.
1,122,957.
Patented Dec. 29, 1914.
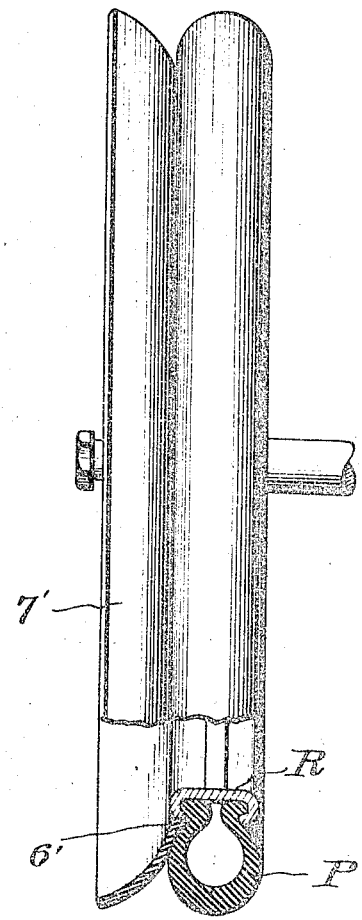

UNITED STATES PATENT OFFICE.

WILLIAM LEE, OF PAWTUCKET, RHODE ISLAND.

MUD-GUARD FOR WHEELS.

1,122,957.

Specification of Letters Patent. Patented Dec. 29, 1914.

Application filed January 17, 1913. Serial No. 742,703.

*To all whom it may concern:*

Be it known that I, WILLIAM LEE, a citizen of the United States, residing at Pawtucket, in the county of Providence and State of Rhode Island, have invented a new and useful Improvement in Mud-Guards for Wheels, of which the following is a specification.

This invention relates to certain new and useful improvements in mud guards for wheels, and relates more particularly to a mud guard which is attached to the wheel to prevent water or mud displaced by the wheel from being thrown laterally away from the latter, in order to prevent mud or water from being splashed against pedestrians, or vehicles, etc.

The primary object of the invention is to provide a mud guard which can be attached to the wheel or to the tire of the wheel in a manner so as to rotate therewith, in order to fulfil the functions above specified.

In the drawings—the figure is a front elevation of a wheel showing the present invention applied thereto, parts being broken away and shown in section.

In accordance with the present invention, the mud guard 7' is constructed of rubber and is formed into ring-like shape, the cross section of which is substantially concavo-convex. The inner circumference of the guard terminates in a curled or rolled over portion 6', which provides an integral enlarged part that extends outwardly from the convex face of the guard and which is capable of being sprung over a side of the wheel rim R to directly seat on the peripheral edge of the rim and to abut the tire P of the wheel. The convex face of the enlarged part directly engages with the adjacent convex side portion of the exposed face of the tire so as to form a tight fit therewith. The periphery of the guard being located farthest from the periphery of the tire, it will be apparent that centrifugal force, during rotation of the guard and tire, will cause the convex face to increase its area of holding engagement with the tire. It will also be apparent, that the entire structure can be made of rubber, and secured in position without the use of metal or other fastening means.

Having thus described my invention, I claim as new and desire to secure by Letters Patent—

A mud guard for wheels consisting of a ring-like flexible member of substantially concavo-convex cross-section, having its inner circumference terminating in a curled or rolled over portion to provide an integral enlarged part which extends outwardly from the convex face of said member and which is capable of being sprung over a side of the wheel rim to directly seat in a peripheral edge of the rim and to abut the tire of the wheel, said convex face adjacent to the enlarged part being for direct engagement with the adjacent convex side portion of the exposed face of the tire and forming a tight fit therewith, and the periphery of said member being located farthest from the periphery of the tire whereby the centrifugal force during rotation of the member and tire will cause the convex face to increase its area of holding engagement with the tire.

In testimony whereof I have signed my name to this specification in the presence of two subscribing witnesses.

WILLIAM LEE.

Witnesses:
 ADA E. HAGERTY,
 J. A. MILLER.